US009688176B2

(12) United States Patent
Mason (10) Patent No.: US 9,688,176 B2
(45) Date of Patent: Jun. 27, 2017

(54) SELF-LOADING DOLLY

(71) Applicant: Paul Mason, Minden, NV (US)

(72) Inventor: Paul Mason, Minden, NV (US)

( * ) Notice: Subject to any disclaimer, the term of this patent is extended or adjusted under 35 U.S.C. 154(b) by 99 days.

(21) Appl. No.: 14/565,707

(22) Filed: Dec. 10, 2014

(65) Prior Publication Data

US 2015/0158408 A1 Jun. 11, 2015

Related U.S. Application Data

(60) Provisional application No. 61/914,241, filed on Dec. 10, 2013.

(51) Int. Cl.
| | | |
|---|---|---|
| *B62B 5/00* | (2006.01) | |
| *B66F 5/02* | (2006.01) | |
| *B60P 1/02* | (2006.01) | |
| *B60B 30/10* | (2006.01) | |

(52) U.S. Cl.
CPC .............. *B60P 1/02* (2013.01); *B62B 5/0083* (2013.01); *B62B 5/0086* (2013.01); *B60B 30/10* (2013.01); *B62B 2202/30* (2013.01); *B62B 2202/90* (2013.01); *B62B 2206/06* (2013.01)

(58) Field of Classification Search
CPC ... B60B 29/002; B60B 30/10; B60B 2340/36; B62B 5/0086; B66F 5/02; B66F 5/025
USPC ........................ 414/426, 427, 458
See application file for complete search history.

(56) References Cited

U.S. PATENT DOCUMENTS

| | | | | |
|---|---|---|---|---|
| 1,650,031 A | | 11/1927 | Nash | |
| 1,964,119 A | * | 6/1934 | Hendry | ..................... B66F 5/00 |
| | | | | 211/23 |
| 2,217,898 A | | 10/1940 | Gemmill | |
| 2,521,819 A | * | 9/1950 | Baer | ........................ B62B 3/04 |
| | | | | 16/30 |
| 3,327,996 A | * | 6/1967 | Morse | ................... B62B 5/0083 |
| | | | | 254/2 R |
| 3,486,650 A | * | 12/1969 | Boone | ................... B62B 3/0625 |
| | | | | 254/2 R |
| 3,702,139 A | * | 11/1972 | Chaffin | ................... B62B 3/104 |
| | | | | 254/2 R |
| 4,123,038 A | | 10/1978 | Meyers | |
| 4,491,452 A | * | 1/1985 | Matovich | ............. B60B 29/002 |
| | | | | 254/4 R |

(Continued)

FOREIGN PATENT DOCUMENTS

| | | | | |
|---|---|---|---|---|
| CA | 2662599 A1 | * | 10/2010 | ................ B66F 5/02 |
| FR | 2901262 A3 | * | 11/2007 | ................ B66F 5/02 |

(Continued)

OTHER PUBLICATIONS

GoJak Self Loading Jack Dolly—Car Positioner. Zendex Tool Corporation. http://www.zendextool.com/gojak/ downloaded on Nov. 13, 2014.

(Continued)

*Primary Examiner* — James Keenan
(74) *Attorney, Agent, or Firm* — Dergosits & Noah LLP; Todd A. Noah (57) ABSTRACT

A self-loading post caster dolly for lifting and moving heavy objects. A fixed structural frame includes a vertical socket. A horizontal lifting bar includes a vertical post that is moved through the vertical socket then secured to hold the object with the lifting bar at a desired height.

19 Claims, 7 Drawing Sheets

(56) References Cited

U.S. PATENT DOCUMENTS

| | | | | |
|---|---|---|---|---|
| 4,649,581 | A * | 3/1987 | Lee, Jr. | A61G 7/1015 414/458 |
| 4,690,605 | A | 9/1987 | Coccaro | |
| 4,854,803 | A | 8/1989 | Coccaro | |
| 5,660,518 | A * | 8/1997 | Meier | B62B 5/0083 180/41 |
| 5,716,186 | A * | 2/1998 | Jensen | A47F 5/108 187/244 |
| 5,924,168 | A * | 7/1999 | Webb | A47B 47/021 16/30 |
| 6,106,214 | A | 8/2000 | Saffelle et al. | |
| 6,171,048 | B1 * | 1/2001 | Grimes | B62B 3/02 414/427 |
| 6,431,805 | B2 * | 8/2002 | Lanciaux, Jr. | B65D 90/14 414/12 |
| 6,773,222 | B1 * | 8/2004 | Gilchrist | B60B 29/002 414/426 |
| 7,311,487 | B1 * | 12/2007 | Crossley | B65G 7/02 414/331.06 |
| 7,328,907 | B1 * | 2/2008 | Bileth | A47F 5/137 280/79.11 |
| 7,597,524 | B2 | 10/2009 | Hernandez | |
| 7,673,887 | B2 | 3/2010 | Hassell | |
| 8,684,654 | B2 * | 4/2014 | Bardin | B60B 30/02 187/231 |
| 8,845,264 | B2 * | 9/2014 | Kubiak | A61G 7/08 414/458 |
| 2003/0091417 | A1 * | 5/2003 | Swann | B62B 5/0083 414/458 |
| 2008/0181755 | A1 * | 7/2008 | Harris | B60B 29/002 414/427 |
| 2011/0016686 | A1 | 1/2011 | Earls | |

FOREIGN PATENT DOCUMENTS

| | | |
|---|---|---|
| WO | 2013/059304 | 4/2013 |
| WO | 2013-059304 A1 | 4/2013 |

OTHER PUBLICATIONS

International Search Report dated Mar. 10, 2015 in corresponding PCT Application No. PCT/US2014/069467.

Written Opinion dated Mar. 10, 2015 in corresponding PCT Application No. PCT/US2014/069467.

* cited by examiner

SELF-LOADING DOLLY

CROSS REFERENCE

This disclosure claims priority from U.S. Provisional Patent Application No. 61/914,241 entitled Universal Self Loading Multi Purpose Post Caster Dolly, filed Dec. 10, 2013, and incorporated by reference herein.

TECHNICAL FIELD

This disclosure relates generally to a self-loading dolly useful for lifting and moving objects, particularly heavy objects such as equipment, aircraft, and vehicles.

BACKGROUND

A dolly is a wheeled platform for moving heavy objects, such as furniture, boat trailers, aircraft, vehicles, equipment or machinery, for example. However, commercially available dollies are either inadequately designed for lifting and moving heavy objects, such as 3000 pounds or more, are overly complex, or are prohibitively expensive for the average consumer.

For example, U.S. Pat. No. 7,597,524 describes a self-loading wheel dolly having a design that is unduly complex. Zendex Tool Corp. sells a similar 4-wheel dolly under the brand name GoJack®, but the GoJack dolly is not useful for heavier vehicles as the largest available model is rated to 6300 lbs (1754 lb/wheel). U.S. Pat. No. 7,673,887 describes a simpler wheel dolly, but it is also not heavy duty and is only useful for towing applications.

Thus, it remains desirable to provide a simple self-loading dolly that is useful for moving and lifting a wide variety of heavy objects.

DETAILED DESCRIPTION

This is a disclosure of a post caster dolly that is self-loading and can be used in a variety of applications, for example, lifting and moving vehicles, heavy equipment, and industrial machinery. In its simplest form, the dolly includes a fixed structural frame having a vertical socket and a horizontal lifting bar having an integrated vertical post that can be moved through the vertical socket of the frame and secured to the frame. Several exemplary embodiments will be described herein.

In use, the dolly frame is positioned adjacent a load. The lifting bar is positioned to engage the load and the vertical post is inserted into the vertical socket of the frame. The lifting bar and vertical post are moved upward through the socket, for example, by applying a hydraulic lift under the lifting bar and post, and the load is thereby raised to a desired height. The post may then be secured at the desired height, for example, by inserting a pin through the frame and the post.

The terms "vertical" and "horizontal" are used herein to designate the usual orientation of the various components and to provide context for proper operation of the various components under normal conditions. However, the use of such terms should not be interpreted as limiting. Further, a number of different methods may be used to lift a load, and several of these methods are described below.

Figure 1:
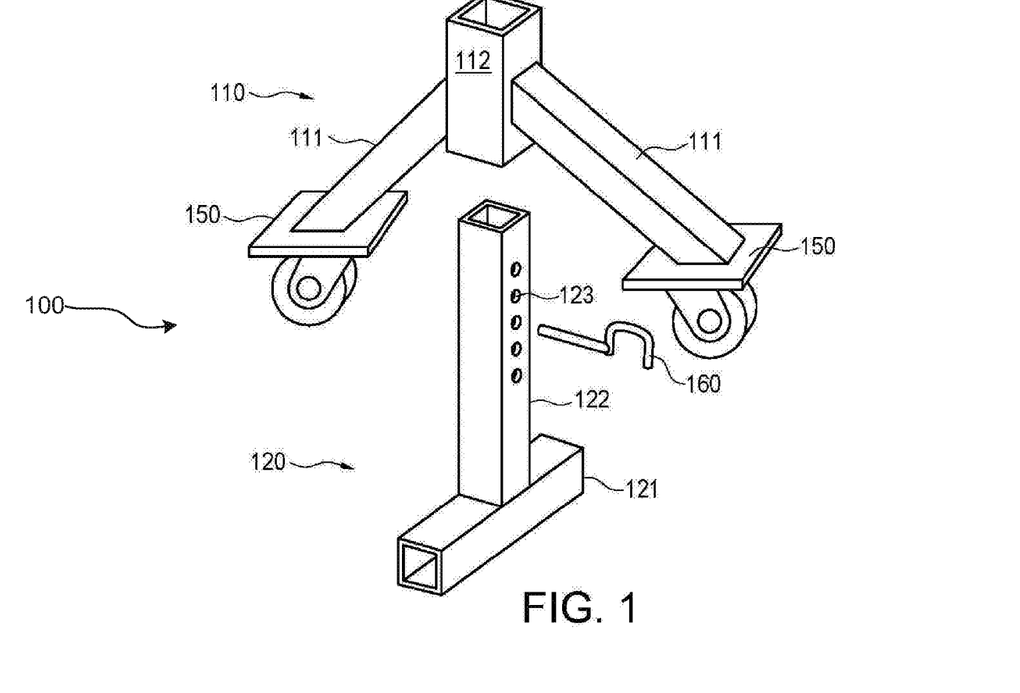
FIG. 1 is an exploded perspective view of the components for one embodiment of a self-loading dolly.

FIG. 1 shows one embodiment of a self-loading dolly 100 with individual components shown in an exploded view. The two basic components of the dolly 100 are frame 110 and lift and support assembly 120.

The frame 110 is formed in an "A" pattern with each of a pair of frame arms 111 coupled at the top end thereof to a vertical socket 112. The vertical socket 112 has a hollow internal cavity running throughout a fixed length such that a separate vertical post 122 is movable through the socket. Each of the frame arms 111 extends symmetrically downward and away from the socket 112 to a point beyond the bottom of the socket, where each arm is coupled at the bottom end thereof to a respective caster wheel assembly 150.

The lift and support assembly 120 includes a lifting bar 121 and a vertical post 122 integrated with the lifting bar. As noted above, the vertical post 122 is sized to mate with the vertical socket 112, e.g., by moving the post up and down through the socket. The lifting bar 121 could be made in a number of different lengths, depending on the application. In one embodiment, the equipment to be moved can be configured with a socket or other receptacle for receiving the lifting bar. In another embodiment, one end of the lifting bar 121 could be configured with a tab, a slot, or other physical feature that is designed to mate with a corresponding tab, slot or physical feature on the equipment to be moved.

In this embodiment, the vertical post 122 includes pairs of holes 123 symmetrically disposed on the post for receiving a pin 160 after the post is raised to the desired height above the socket 112 in order to secure the post (and the load) at that height. Other mechanical features may also be employed to secure the post 122 to the frame 120 at the desired height. For example, a series of horizontal grooves could be embedded in the post 122, and a cotter pin or a plate could be pushed onto the post. As another example, the socket 112 and post 122 could be configured with a gear and a pawl in order to ratchet the post up and a release to let the post down. Other known mechanical fasteners and couplers could also be used.

A variety of methods may be used to lift the load. As indicated above, external hydraulics could be used. For example, a rolling hydraulic floor jack is inexpensive and commonly used in home garages and industrial garages. Similarly, a hydraulic assembly or a pneumatic cylinder could be incorporated internally into the dolly assembly. Finally, a jackscrew could be incorporated to pull the post assembly up into the socket of the A-frame.y The arms 111, socket 112, lifting bar 121 and vertical post 122 are the structural members of the dolly 100. In one embodiment, these structural members are made from round or square structural steel tubing or equivalent material. Further in this embodiment, the arms 111 are welded to the socket 112, and the vertical post 122 is welded to the lifting bar 121. Other materials with suitable connection methods could also be employed.

These structural components can be sized to support a specified load range or a variety of different load ranges in accord with well-known principles of structural engineering, and the size and strength of the welds must be consistent with such specifications. As an example, larger structural components or thicker walls on the structural components will support heavier loads. Thus, equipment or machinery loads up to 20,000 pounds or more can be safely lifted and moved through specifying appropriate structural members, welds and wheels for a dolly 100 or set of dollies. The wheel assemblies 150 are generally known plate caster assemblies that are readily available as off-the-shelf assemblies, and should be selected to match the specified load range.

In some embodiments, the mounting plates for the caster wheels are offset from the center axis of arms 111. This permits additional flexibility in configuring the dolly for different applications. For example, securing the wheels to a different portion of the plate may present a different height profile for the dolly relative to the equipment to be moved.

Figure 2:
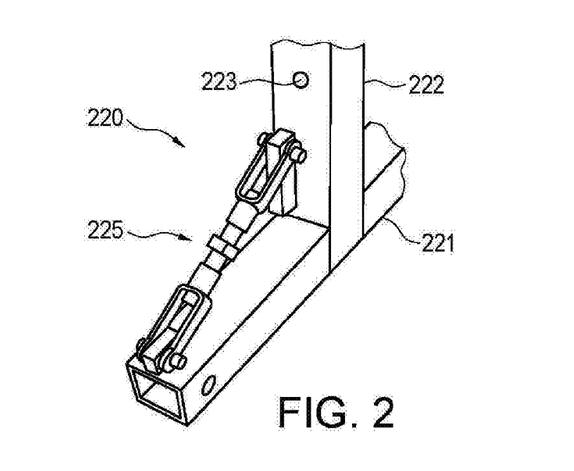
FIG. 2 is a perspective view of an alternative embodiment of one of the components in FIG. 1.

FIG. 2 shows an embodiment of a lift and support assembly 220 that is similar to assembly 120, but includes an angle adjustment mechanism 225 coupled between an end of the lift bar 221 and the vertical post 222. The angle adjustment mechanism 225 may be used to provide camber adjustment in order to keep the caster turntable flat at all socket angles, which can be important for stabilizing and moving heavy loads. In one example, the angle adjustment mechanism 225 is a manual turn-buckle.

The camber adjustment controls the position of the vertical post 222 to achieve a level position of the caster turntable, which in turn frees up the caster turntable to easily rotate in any direction. However, the camber adjustment can also be used to raise and lower the lifting bar as follows. The vertical post 222 and the frame 110 could be rotated downward to a nearly horizontal position, as permitted by an axis bolt (not shown) that couples the post 222 to the lift bar 221. The lift bar 221 is then inserted into the lifting socket 112 and locked in position with pin 160. As the post 222 and frame 111 are raised toward a vertical position, the caster wheels, which are below the center of the axis bolt in lifting bar 221, will raise the A-frame and vertical post thereby lifting the load.

Figure 3A:
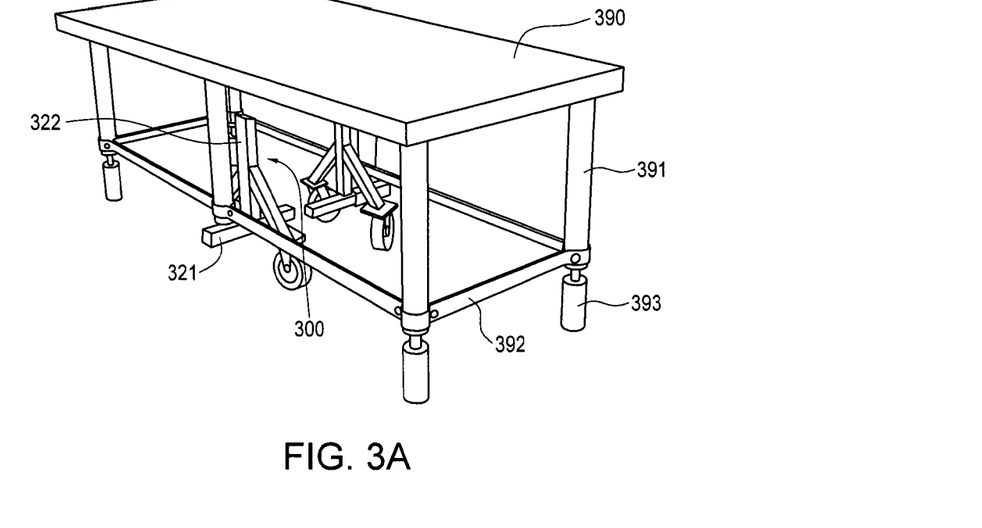
FIG. 3A is a perspective view of the self-loading dolly of FIG. 1 in use for lifting and moving an industrial welding table.

FIG. 3A illustrates the use of a pair of dollies 300 to lift and move a piece of equipment, such as an industrial welding table 390. The table 390 has six legs 391 connected by leg bracing 392, but in this example, only the corner legs have extenders 393 that are used for stationary placement of the table. The center legs are not extended.

To move the table 390, a dolly 300 is placed adjacent each of the center legs and respective lifting bars 321 are placed under each of the center legs. The bars 321 are lifted and the respective posts 322 of each dolly are secured within respective sockets 312 when the load is at the desired height, e.g., when the table has been lifted off its legs. The table may then be moved across the facility to another location, and the lifting bars lowered to reseat the table.

Figure 3B:
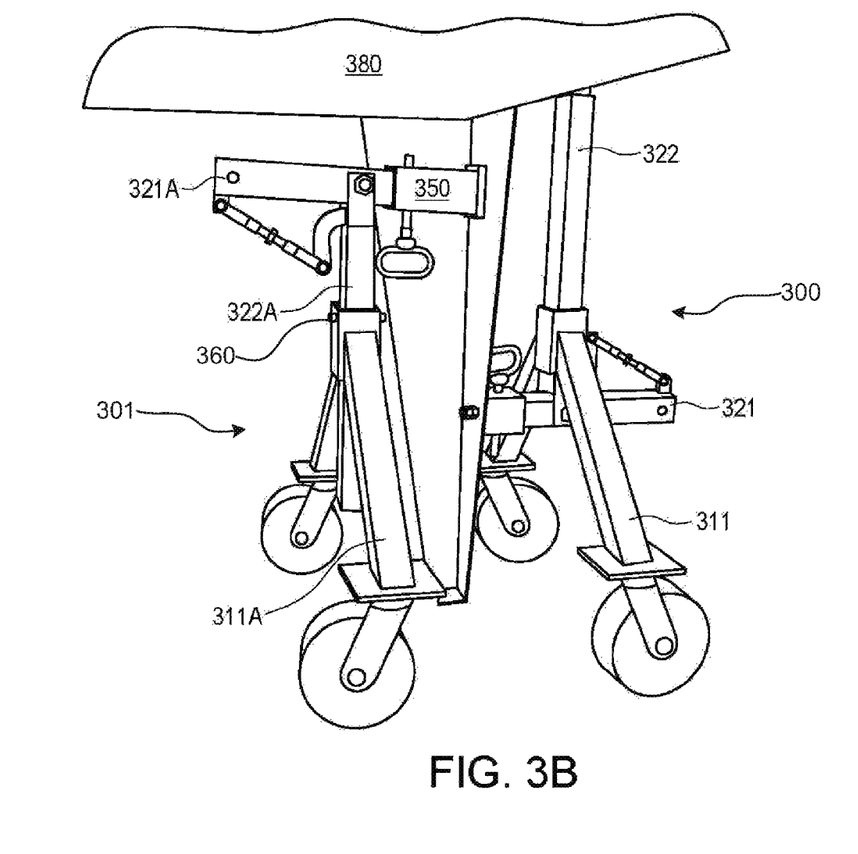
FIG. 3B is a perspective view of the self-loading dolly of FIG. 1 used in an alternative configuration for lifting and moving equipment.

FIG. 3B illustrates an alternative configuration for a pair of dollies 300, 301 to be used for moving a large piece of equipment. Dolly 300 is used in its normal configuration, as described above, with the frame 311 placed adjacent to the equipment 380, and the lifting bar 321 placed under a leg and raised, e.g., by a hydraulic lift under the lifting bar, with the vertical post 322 then pinned in place. However, in this embodiment, dolly 301 has its frame 311A placed adjacent to the equipment 380, but the equipment also includes a socket mount 350 affixed to the table, e.g., by weldment, at a much higher position on the leg. The vertical post 322A is thus inverted and placed through the vertical socket 312A from the top, and the lifting bar 321A is fit into the socket mount 350. The jack pad will be used directly under the vertical post 322A instead of under the lifting bar 321, and the post is secured is place with pin 360. This inverted configuration increases the lifting range of the dolly, but does not change the camber adjustment feature or the self-loading feature.

Figure 4:
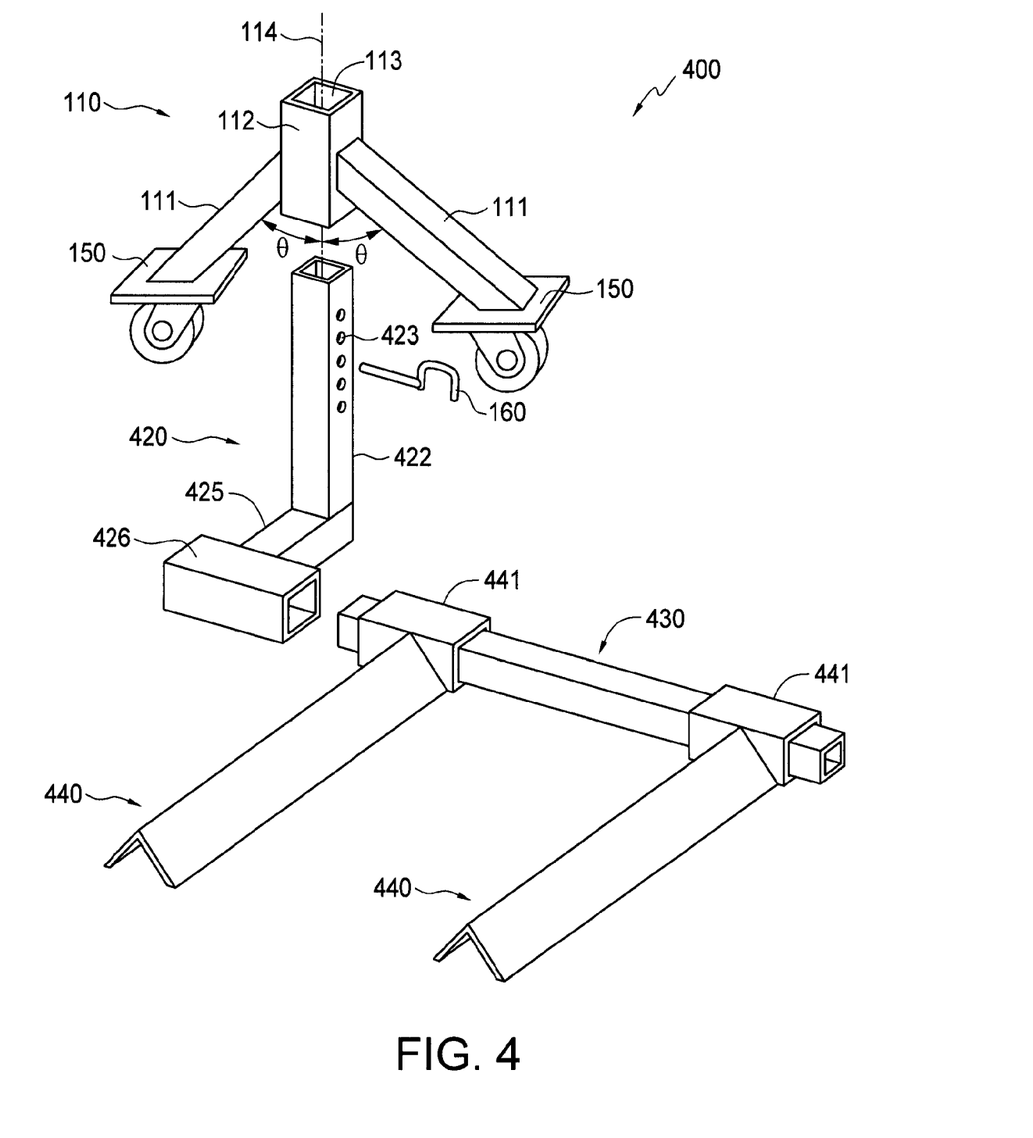
FIG. 4 is an exploded perspective view of the components for an alternative embodiment of a self-loading dolly.

FIG. 4 shows another embodiment of a self-loading dolly 400 with individual components shown in an exploded view that is useful for lifting wheeled equipment including vehicles and aircraft. In this embodiment, there are four basic components: a frame 110, a post assembly 420, a lifting bar 430, and a pair of extension lifting arms 440.

The frame 110 is the same as in FIG. 1, namely, an "A" frame with each of a pair of frame arms 111 coupled at the top end thereof to a vertical socket 112. The vertical socket 112 has a hollow internal cavity running throughout a fixed length such that post 422 is movable through the socket. Each of the frame arms 111 extends symmetrically downward and away from the socket 112 to a point beyond the bottom of the socket, where each arm is coupled at the bottom end thereof to a respective caster wheel assembly 150.

The post assembly 420 includes a vertical post 422 coupled to an extension portion 425 which in turn is coupled to a horizontal lift socket 426. The extension portion 425 provides a horizontal offset that enables generating lifting leverage further away from the frame 110.

The vertical post 422 includes pairs of holes 423 symmetrically disposed on the post for receiving pin 160 after the post is raised to the desired height above the socket 112 in order to secure the post (and the load) at the desired height. However, other mechanical features may also be employed to secure the post 422 to the frame 110 at the desired height.

A separate lift bar 430 is sized to mate with the horizontal lift socket 426, e.g., by moving the lift bar through the socket. Lifting arms 440 are provided that extend laterally away from the dolly frame 110, each arm having an arm socket 441 that slides over the lifting bar 430.

The frame arms 111, socket 112, post assembly 420, lift bar 430 and lifting arms 440 are the structural members of the dolly 400, and in one embodiment, are made from structural steel tubing and connected by weldment.

Figure 5:
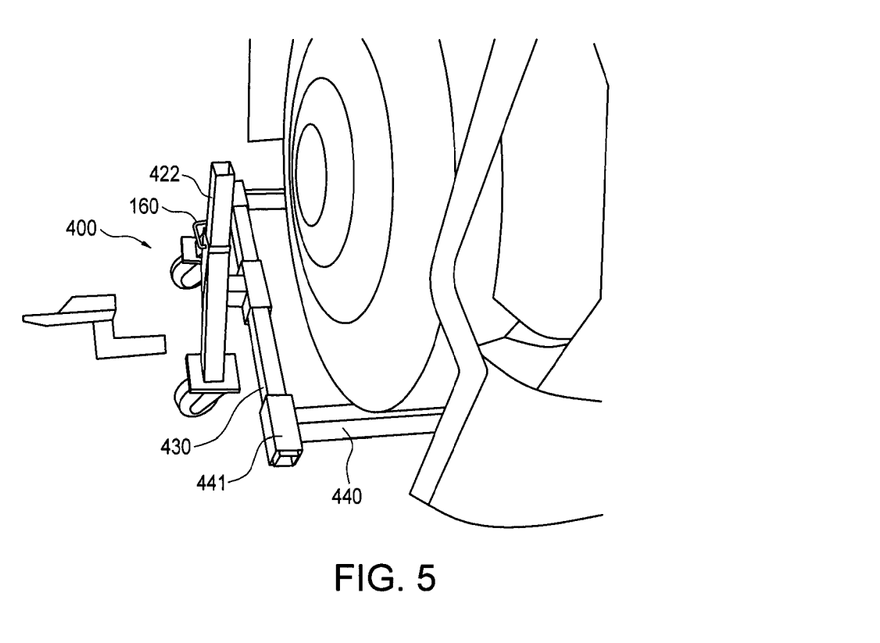
FIG. 5 is a perspective view of the self-loading dolly of FIG. 4 in use for lifting and moving a wheeled vehicle.

FIG. 5 shows the assembled dolly 400 with the lifting arms 440 engaging a vehicle tire. In this embodiment, the arm sockets 441 slide onto the lifting bar 430 and are used to guide the lifting arms 440 to the edge of the inside tire sidewall. The inside caster axles of the vehicle are the end point for lifting arm rotation. When the vertical post 422 is hydraulically raised by a lifting pad or pedal into the dolly socket 112, the lifting arms become level and at that point raise the tire off the ground thereby transferring the load onto the dolly when the locking pin 160 is in place and the hydraulics are relaxed. Note that the lifting leverage of using the hydraulic jack can be increased by increasing the distance between the jack pad and the casters fixed at the end of the tire lifting cradle. The maximum weight capacity is only limited by the rating of the individual casters. When the hydraulic lift is again applied, the locking pin 160 is removed and the pad is lowered thereby transferring the load from the dolly to the ground.

Note that the post 422 is leaning in toward the top of the tire due to the static overload on the dolly post and socket used in this particular stress test. To correct this issue, the post could be cambered or tilted out away from the tire before welding or taking other repair action.

In one embodiment, the mounting plates for the casters 150 at the end of the lifting arms 111 are offset from the arm center thus allowing the user to turn the lifting arms over and re-attach the casters on the opposite sides of the plate to increase or decrease the height of the caster assembly in relation to the lifting arms for different applications.

In some embodiments, the lifting arms 440 are two long cradle bars reaching from one side to the other side of a vehicle or equipment, with one self-loading dolly on each side to raise the load. The contact point is at the cradle, e.g., under the tires or frame pads that contact the vehicle or equipment frame, and the vehicle or equipment can then be raised to an acceptable height. This eliminates jacking under the vehicle or equipment frame, as required by most of the devices current marketed. This also eliminates possible damage to vehicles or equipment when jack pads slip or miss the frame and crush soft parts surrounding the frame, or drop the load unexpectedly, possibly resulting in injury to the operator.

Maximum height is only be limited by the A-Frame height and width. The number of dollies and cradles required depends on the length and weight of the vehicle or equipment being lifted. A large object with significant length, such as long press breaks or lathes, would require a series of post dollies with either sockets or cradles under the intended load.

Figure 6:
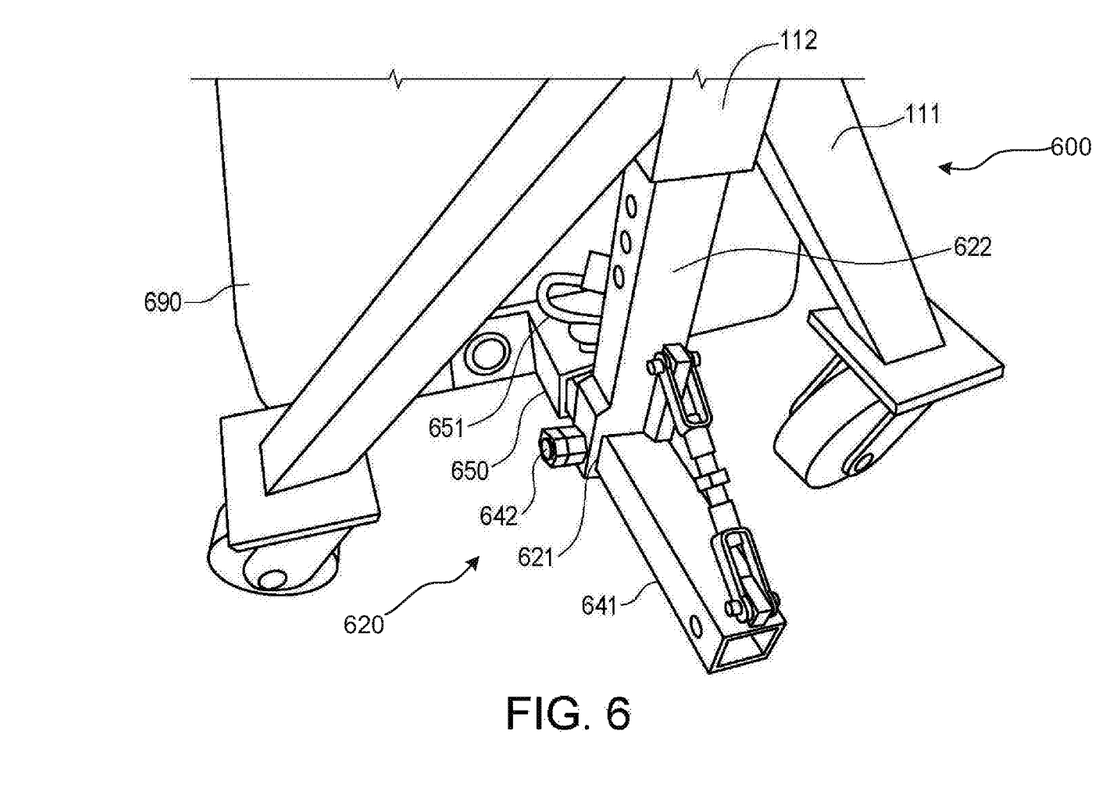
FIG. 6 is a perspective view of an alternative embodiment of a self-loading dolly used with a socket mount on a piece of equipment.

FIG. 6 illustrates another dolly 600. In this embodiment, the socket 112 of A-frame 111 receives the vertical post 622 of the support assembly 620. Affixed at the bottom of the vertical post 622 is a socket 621 that receives lifting bar 641. A bolt 642 can be used through socket 621 to fix the lifting bar 621 is a horizontal position. A socket mount 650 is affixed onto a piece of equipment or machinery 690, for example, by drilling mounting holes in the equipment or machinery and bolting the socket mount into the mounting holes. The lifting bar 641 is fit into the socket mount 650 and secured in place by pin 651. The socket mount could be made in a number of different ways to properly fit with a particular application.

Figure 7:
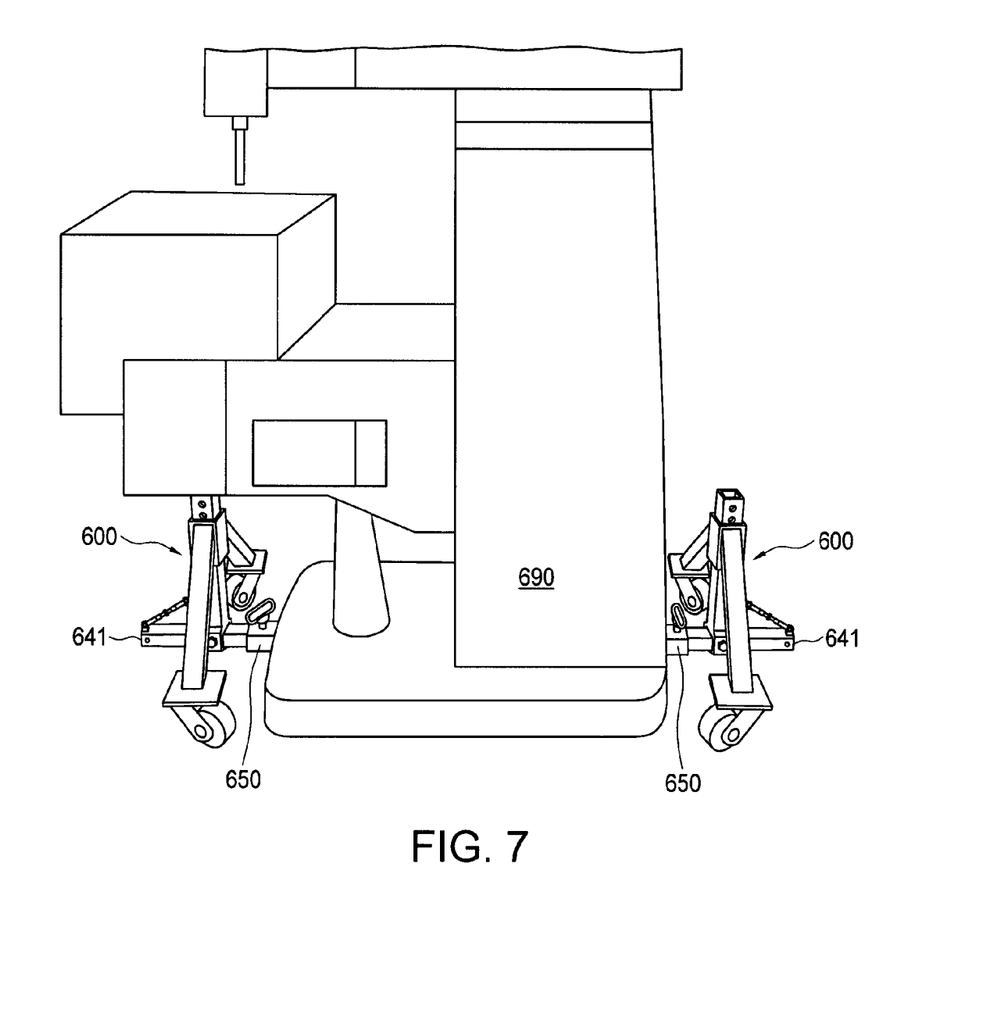
FIG. 7 is a perspective view of a pair of self-loading dollies as in FIG. 6 used with a socket mount to lift a piece of equipment.

FIG. 7 shows the use of a pair of dollies 600 on either side of a piece of equipment 690, with socket mounts 650 affixed on both sides of the equipment, and lifting bars 641 inserted into respective socket mounts.

As another example, the dollies described herein can be used to move tandem axle trailer units or RV's sideways to maneuver around objects or park a trailer or vehicle up tight against a storage unit wall or in a corner.

A key advantage of the socket and structural tubing assembly is that it can be adjusted to any position, is fully movable, and locks itself when weight is applied to the socket joint without using bolts or other hardware as required in prior art solutions. The lifting bar can be lengthened to accommodate larger wheel assemblies such as aircraft, front end loaders or other construction equipment. The size of the structural tubing and socket assembly can easily be increased to handle larger loads using the same basic design configuration. Further, multiple dollies can be placed in tandem on the lifting bar as necessary, for example, to move a long heavy machine.

In an embodiment for lifting and moving non-wheeled equipment, such as industrial machinery, pallets, or a safe, the lifting arms may be thin flat bars to be placed under the load with sliding sockets that can be adjusted to lock against the side of the object being lifted. Such sockets can be used on the top or bottom of the bar as required.

While one or more implementations have been described by way of example and in terms of specific embodiments, it should be understood that one or more implementations are not limited to the disclosed embodiments. To the contrary, this disclosure is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A self-loading dolly, comprising:
a frame having a vertical socket and a pair of frame arms co-planar with the vertical socket, the vertical socket having an open top end, an open bottom end and an internal cavity between the top and bottom ends, both frame arms coupled at a first end to the vertical socket and extending radially downward and beyond the open bottom end of the vertical socket, each frame arm coupled at a second end to a respective wheel assembly;
a horizontal lifting bar having an integrated vertical post extending upward from the lifting bar, the vertical post being configured to fit within the open bottom end and internal cavity of the vertical socket and movable within the internal cavity of the vertical socket; and
a removable mechanism holding the vertical post in a fixed position within the internal cavity of the vertical socket.

2. The self-loading dolly of claim 1, further comprising:
a plurality of through holes disposed along the vertical post; and
the removable mechanism being a pin that is inserted through one of the through holes in the vertical post.

3. The self-loading dolly of claim 1, further comprising:
a camber adjustment mechanism coupled between one end of the lifting bar and the vertical post.

4. The self-loading dolly of claim 3, wherein the camber adjustment mechanism is a turnbuckle.

5. The self-loading dolly of claim 1, further comprising:
an extension portion coupled between the lifting bar and the vertical post, the extension portion providing a horizontal offset away from the frame.

6. The self-loading dolly of claim 5, further comprising:
at least one lifting arm coupled to the lifting bar and extending away from the frame.

7. A self-loading dolly, comprising:
a frame having a pair of frame arms and a vertical socket, the vertical socket having an open top end, an open bottom end and an internal cavity between the top and bottom ends, both frame arms coupled at a first end to the vertical socket and extending radially downward and beyond the open bottom end of the vertical socket, each frame arm coupled at a second end to a respective wheel assembly;
a lift and support assembly having a horizontal lift socket, an extension portion coupled to the horizontal lift socket, and a vertical post coupled to the extension portion, the horizontal lift socket having a pair of open ends and an internal cavity between the ends, the vertical post is configured to fit within the open bottom end and internal cavity of the vertical socket and moveable within the internal cavity of the vertical socket, and the extension portion creates an offset away from the frame for the horizontal lift socket;

a lifting bar configured to fit within the internal cavity of the horizontal lift socket and moveable within the internal cavity of the horizontal lift socket; and a mechanism holding the vertical post in a fixed position within the internal cavity of the vertical socket.

8. The self-loading dolly of claim 7, further comprising:
at least one lift arm having a lift arm socket coupled to a first end of the lift arm, the lift arm socket sized to fit over the lifting bar and be moveable relative to the lifting bar, the lift arm extending away from the first end to support a load.

9. The self-loading dolly of claim 7, further comprising:
a plurality of through holes disposed along the vertical post, the mechanism being a pin that is inserted through one of the through holes in the vertical post.

10. The self-loading dolly of claim 7, further comprising:
a camber adjustment mechanism coupled between one end of the horizontal lift socket and the vertical post.

11. The self-loading dolly of claim 10, wherein the camber adjustment mechanism is a turnbuckle.

12. A self-loading dolly, comprising:
a vertical socket having an open top end, an open bottom end, and an internal cavity between the top and bottom ends with a first axis oriented in a vertical direction;

a pair of frame arms, each frame arm having a first end coupled to the vertical socket and extending radially downward beyond the open bottom end of the vertical socket and a second end coupled to a respective wheel assembly;

a vertical post configured to fit within the open bottom end and internal cavity of the vertical socket and moveable along the first axis within the internal cavity of the vertical socket;

a horizontal socket having a pair of open ends and an internal cavity between the ends with a second axis oriented in a horizontal direction, the horizontal socket coupled to a bottom of the vertical post; and a support bar sized to fit within the internal cavity of the horizontal socket and moveable along the second axis within the internal cavity of the horizontal socket.

13. The self-loading dolly of claim 12, further comprising:
an extension portion coupled between the horizontal socket and the vertical post, the extension portion providing an offset away from the frame.

14. The self-loading dolly of claim 13, further comprising:
at least one lift arm having a lift arm socket coupled to a first end of the lift arm, the lift arm socket sized to fit over the support bar and be moveable relative to the support bar, the lift arm extending away from the first end to support a load.

15. The self-loading dolly of claim 13, further comprising:
a pair of lift arms, each lift arm having a lift arm socket coupled to a first end of the lift arm, the lift arm socket sized to fit over the support bar and be moveable relative to the support bar, the lift arm extending away from the first end to support a load.

16. The self-loading dolly of claim 12, further comprising:
a mechanism holding the vertical post in a fixed position within the internal cavity of the vertical socket.

17. The self-loading dolly of claim 16, further comprising:
a plurality of through holes disposed along the vertical post, the mechanism being a pin that is inserted through one of the through holes in the vertical post.

18. The self-loading dolly of claim 12, further comprising:
an angle adjustment mechanism coupled between one end of the horizontal socket and the vertical post.

19. The self-loading dolly of claim 18, wherein the angle adjustment mechanism is a turnbuckle.

* * * * *